United States Patent [19]
Tokunaga

[11] Patent Number: 5,077,761
[45] Date of Patent: Dec. 31, 1991

[54] ELASTIC BUFFER CIRCUIT

[75] Inventor: Atsuhiko Tokunaga, Tokyo, Japan

[73] Assignee: NEC Corporation, Japan

[21] Appl. No.: 520,667

[22] Filed: May 8, 1990

[30] Foreign Application Priority Data

May 8, 1989 [JP] Japan .................................. 1-115732

[51] Int. Cl.$^5$ .............................................. H04L 7/00
[52] U.S. Cl. .................................... 375/118; 370/102; 370/108
[58] Field of Search ............... 375/106, 118, 110, 108; 328/63, 72, 155; 307/269; 370/100.1, 102, 108, 104.1, 105.3

[56]  References Cited
U.S. PATENT DOCUMENTS

| | | | |
|---|---|---|---|
| 3,531,777 | 9/1970 | West | 375/118 |
| 3,809,820 | 5/1974 | Sullivan | 375/118 |
| 4,270,183 | 5/1981 | Robinson et al. | 375/118 |
| 4,596,026 | 6/1986 | Cease et al. | 370/102 |
| 4,718,074 | 1/1988 | Mannas et al. | 375/118 |
| 4,757,521 | 7/1988 | Korsky et al. | 370/108 |
| 4,791,488 | 12/1988 | Fukazawa et al. | 375/118 |
| 4,885,758 | 12/1989 | Speckenbach | 375/118 |

Primary Examiner—Stephen Chin
Attorney, Agent, or Firm—Ostrolenk, Faber, Gerb & Soffen

[57] ABSTRACT

An elastic buffer circuit for adjusting the timing between a satellite communication system of a time division multi-access (TDMA) type and a ground communication system is provided with a stable oscillator for generating a first clock signal whose frequency is N (N is an integer not smaller than 2) times the received clock frequency, a clock generating circuit for generating a second clock signal by frequency-dividing the first clock signal by N and, at the same time, setting the phase of the second clock signal on the basis of a sync code detection signal, and a data memory circuit for temporarily storing data signals in accordance with the second clock signal.

4 Claims, 7 Drawing Sheets

ELASTIC BUFFER CIRCUIT

BACKGROUND OF THE INVENTION

The present invention relates to an elastic buffer circuit, and more particularly to an elastic buffer circuit for use in a satellite communication receiving system of a time division multi-access (TDMA) type to adjust the timing between burst data signals from the satellite and signals handled by the ground communication system.

In transferring burst data signals, transmitted via a satellite, to a ground communication system, data signals demodulated by a demodulator should be converted into signals adapted to the timing of the ground communication system. In a satellite communication system or a mobile communication system, a clock signal recovered from burst data signals contains phase jitter, which should be absorbed on the receiving side of the satellite or mobile communication system before the signals are transferred to the ground communication system. An elastic buffer circuit is used in this timing conversion.

Into an elastic buffer circuit are entered from a demodulator a burst synchronization (sync) code having a unique word and data signals following it. A received recovered clock signal, extracted by the demodulator, is also entered into the elastic buffer circuit, which detects a burst sync code according to this received recovered clock signal and stores the data signals following this burst sync code into a data memory circuit built into the elastic buffer circuit. An address for writing the data signals into the data memory circuit is generated according to the received recovered clock signal.

Meanwhile, in accessing the data memory circuit from a terminal, the terminal supplies a read clock signal to the data memory circuit to read out the data signals stored therein In this manner, the burst data signals from the satellite are converted into signals adapted to the timing of the ground communication system.

In a satellite communication system, if the electromagnetic wave received from the satellite is weakened by rain-caused attenuation or the like, the clock signal may become lost. In the absence of the clock, the data signal whose time position corresponds to the lost clock will not be written into the data memory circuit. If such a clock loss occurs, even if the reception of the clock signal is restored to its normal level, there will arise a data shift in the position in the data memory circuit into which the data signal is written after the restoration of the clock. Thus every data signal after the clock loss is written into a wrong address of the data memory circuit to invite burst errors.

SUMMARY OF THE INVENTION

A first object of the present invention is to provide an elastic buffer circuit which is subject to no burst error in output signals from the data memory circuit even if a clock loss occurs.

A second object of the invention is to provide an elastic buffer circuit for quickly establishing phase synchronization.

According to the invention, there is provided an elastic buffer circuit for converting, in transferring burst data signals transmitted via a satellite to a ground communication system, data signals demodulated by a demodulator into signals adapted to the timing of the ground communication system, comprising: synchronization code detecting means for detecting a burst synchronization code in received burst signals and supplying a detection signal; stable clock generating means for generating a first clock signal of a frequency equal to N (N is an integer not smaller than 2) times the received clock frequency; clock regenerating means for dividing the first clock signal by N and generating a second clock signal whose phase is determined by said detection signal; and data memory means responsive to said detection signal for starting writing operation and responsive to said second clock signal for temporarily storing data signals following said burst synchronization code.

Since the second clock signal which is timed with the detection of the burst synchronization code and generated by the clock generating means running based on the stable clock generating means is used as the write clock for the data memory means, the data signal can be written in without inviting data shift in bit position even if there is a loss in clock in the received recovered clock signal.

DETAILED DESCRIPTION OF THE EMBODIMENT

First, to facilitate an understanding of the present invention, a prior art elastic buffer circuit will be described with reference to FIGS. 1 to 3.

Figure 1:
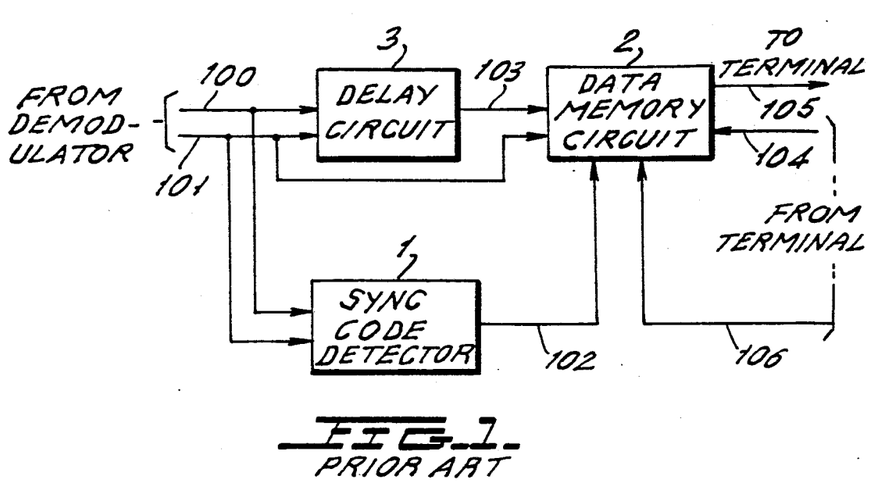
FIG. 1 is a block diagram illustrating a prior art elastic buffer circuit.

In FIG. 1, the elastic buffer circuit by the prior art comprises a synchronization code detector (sync code detector) 1, a data memory circuit 2 and a delay circuit 3. The sync code detector 1 receives a burst of a burst sync code and ensuing data signals 100 and a received recovered clock signal 101 from a demodulator (not shown) to detect the burst sync code, and produces a sync detection signal 102. The delay circuit 3 receives the burst of the burst sync code and ensuing data signals 100 and the received recovered clock 101, and outputs a data 103 with the time delay required by the sync code detector 1 for detecting the sync code. The delay circuit 3 may consist of three flip-flop circuits. The data memory circuit 2, whose write addresses are initialized by the detection signal 102, stores the data 103 in response to the received recovered clock signal 101. The data stored into the data memory circuit 2, whose read addresses are initialized by a read start signal 106 from the ground communication system (a terminal), are outputted as output data signals 105 according to a read clock signal 104.

Now will be explained how a burst error occurs in the output data signals when a clock loss takes place in the received recovered clock signal 101 with reference to FIGS. 2 and 3.

Figure 2:
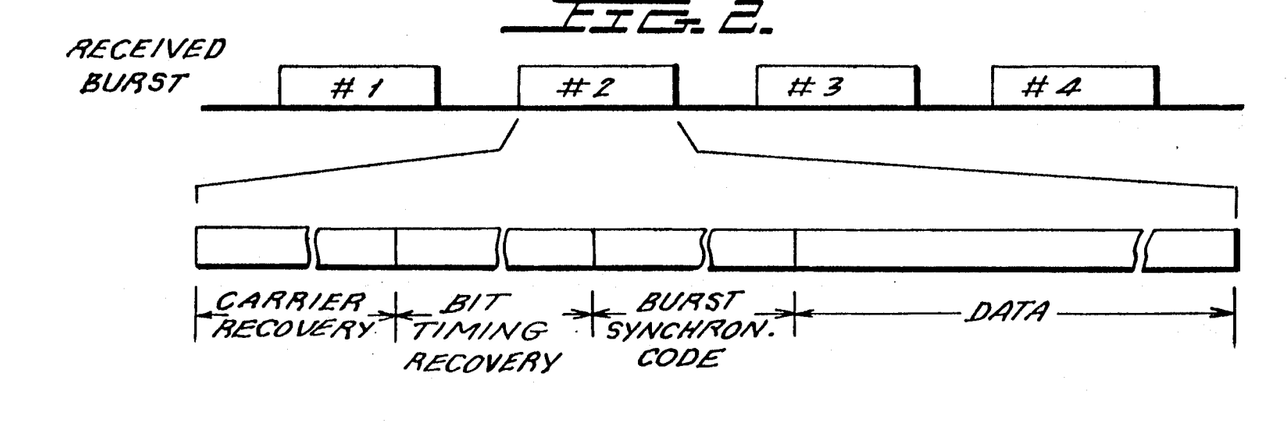
FIG. 2 is a diagram illustrating burst signals sent from a satellite.

In FIG. 2, the received burst signals entered into the demodulator consist of a carrier recovery signal, a bit timing recovery signal, a burst sync code and data signals having n data. The demodulator (not shown), using the carrier recovery signal and the bit timing recovery signal, makes preparations for extracting the carrier and the clock from the ensuing data.

Figure 3:
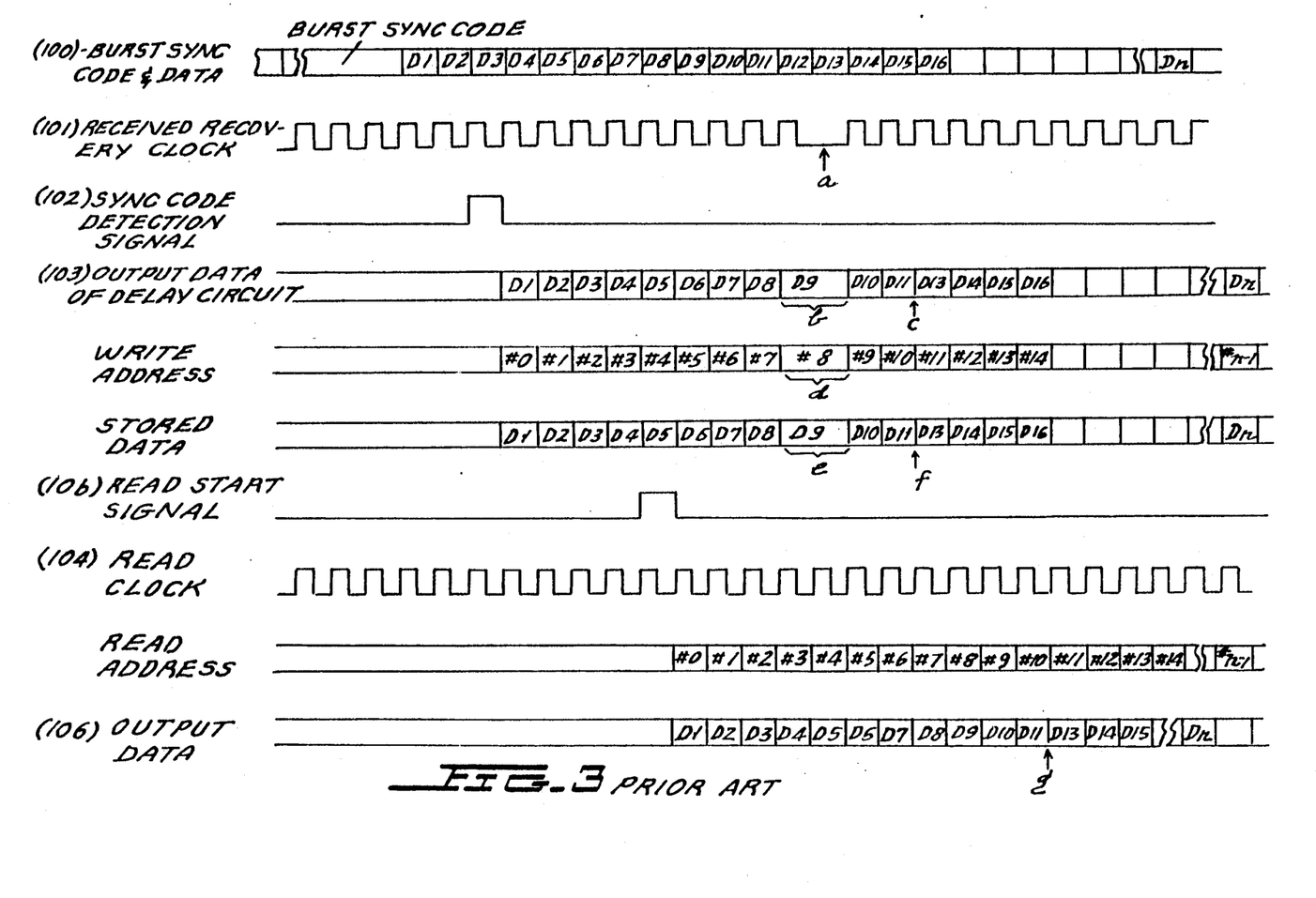
FIG. 3 is a timing chart covering various parts of the circuit shown in FIG. 1.

In FIG. 3, if a loss (a) occurs in the received recovered clock signal 101, a data (D12) corresponding to this loss (a) cannot be entered into the delay circuit 3, so that the output data signal of the delay circuit 3 will not contain the data (D12). Since the delay circuit 3 operates according to the received recovered clock signal 101 involving this loss (a), it will output in a part (b) the same data (D9) at two consecutive clock times.

The write addresses of the data memory circuit 2 are initialized by the sync code detection signal 102, and counted up by the received recovered clock signal 101. As the received recovered clock signal 101 involves a loss (a), however, the write address is not counted up in the part where the clock is missing as shown in FIG. 3(d).

In the data memory circuit 2 is stored, according to the write address thereby generated, the delay circuit output data 103 having the part (b) in which the same data (D9) is supplied at two consecutive clock times and a part (c) in which the data (D12) is absent. As a result, what is stored in the data memory circuit 2 skips the received data (D12) which is entered while the clock is missing, and each of the data from (D13) on is stored one address ahead of its position in the presence of the clock.

One of the conceivable solutions to this problem is the use of a phase-locked loop (PLL) circuit to generate consecutive clocks within the receiving station. However, since a PLL circuit takes a certain length of time to establish phase synchronism, while it can be effective if the incoming receivable signals are consecutive, no accurate data extraction can be warranted for burst signals in TDMA communication until the time when the pull is reached. Moreover, a PLL circuit involves an analog circuit, which makes the circuit designing more difficult.

Now will be described in detail the present invention with reference to FIGS. 4 to 10.

Figure 4:
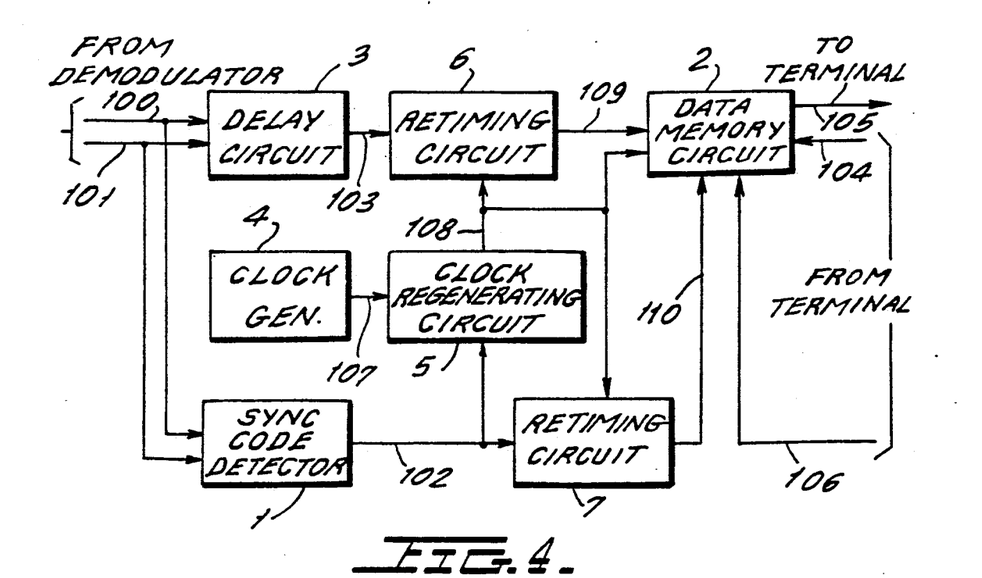
FIG. 4 is a block diagram illustrating an elastic buffer circuit according to the present invention.

In FIG. 4, an elastic buffer circuit according to the invention consists of a sync code detector 1, a data memory circuit 2, a delay circuit 3, a clock generator 4, a clock regenerating circuit 5 and retiming circuits 6 and 7. The sync code detector 1, the data memory circuit 2 and the delay circuit 3 operate in respectively the same manners as the corresponding ones in the prior art configuration illustrated in FIG. 1.

The clock generator 4 supplies a first clock signal 107 whose frequency is N times the received clock frequency. The clock regenerating circuit 5 divides the frequency of the first clock signal 107 by N to generate a clock signal having the same frequency as the received recovered clock signal 101. Since the frequency-divided clock signal as it is involves the uncertainty of allowing N alternatives in phase, the phase of a second clock signal 108 is fixed with reference to the detection signal 102. The retiming circuits 6 and 7 synchronize the delay circuit output data signal 103 and the detection signal 102, respectively, with the second clock signal 108.

The present invention allows no burst error to arise in the output data signal 105 from the data memory circuit 2 even if a loss occurs in the received recovered clock signal 101. The reason will be explained below with reference to the timing chart of FIG. 5.

Figure 5:
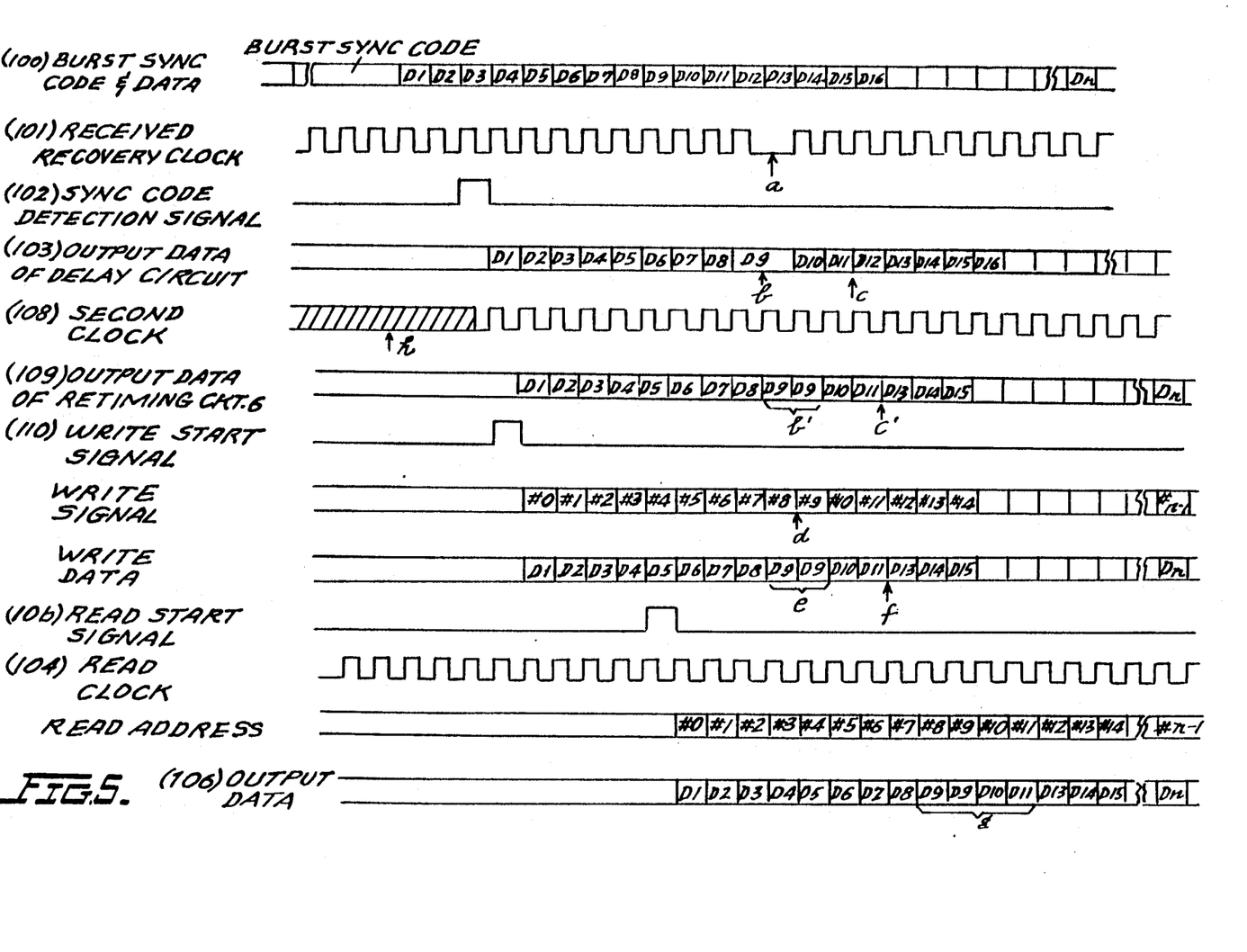
FIG. 5 is a timing chart covering various parts of the circuit shown in FIG. 4.

The received burst signals, like in the prior art, consist of a carrier recovery signal, a bit timing recovery signal, a burst sync code signal and data signals having n data.

If a loss (a) occurs in the received recovered clock signal 101, as in the prior art illustrated in FIG. 1, there will emerge in the delay circuit output data signal 103 a part (b) in which a data (D9) is retained and another part (c) in which a data (D12) is absent.

For the second clock signal 108 outputted from the clock regenerating circuit 5, generates a clock signal having the phase immediately following the leading edge of the sync code detection signal 102, and supplies to the retiming circuits 6 and 7 and the data memory circuit 2.

The delay circuit output data signal 103 is sampled in the retiming circuit 6 by the second clock signal 108 having no missing part, and turned into an output data signal 109 of the retiming circuit 6 having a part (b') in which two (D9) bits are present and another part (c') where the data (D12) is absent.

The detection signal 102, sampled in the retiming circuit 7 by the second clock signal 108, is supplied to the data memory circuit 2 as a write start signal 110. After write addresses are initialized by this write start signal 110, the output data signal 109 of the retiming circuit 6 is stored into the data memory circuit 2 in accordance with the second clock signal 108. Thus the data (D9) is written into write addresses (#8) and (#9), the data (D13) into (#12), and the ensuing data are likewise written into the data memory circuit 2. What should be noted here is that the data from (D13) on are written into the addresses where they should be written in if the clock loss had not arisen.

Then, after read addresses are initialized by the read start signal 106 from the terminal, a stored data signal is supplied as the output data signal 105 in response to a read clock signal 104. In the output data signal 105, the data (D12) is absent and two (D9) bits are consecutively present in its part (g), so that bit errors do occur in the part (g). Since there are no errors in the data following the part (g) unlike in the prior art, however, there can arise no burst position error.

Figure 6:
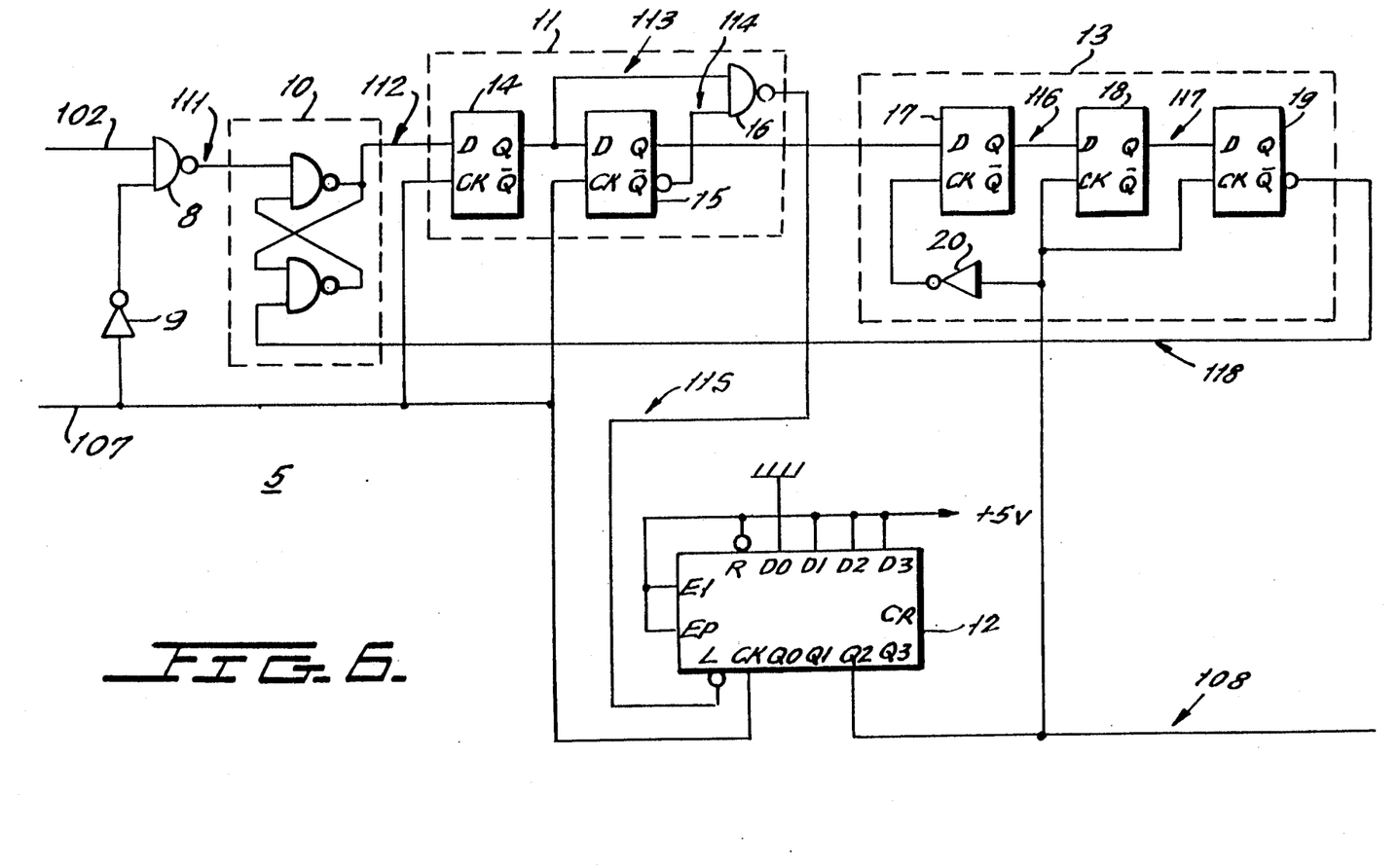
FIG. 6 is a detailed diagram illustrating the clock regenerating circuit used in FIG. 4.

Referring to FIG. 6, the clock regenerating circuit 5 consists of a NAND gate 8, an inverter 9, a set/reset circuit 10, a differentiating circuit 11, a counter 12 and a delay circuit 13.

Figure 7:
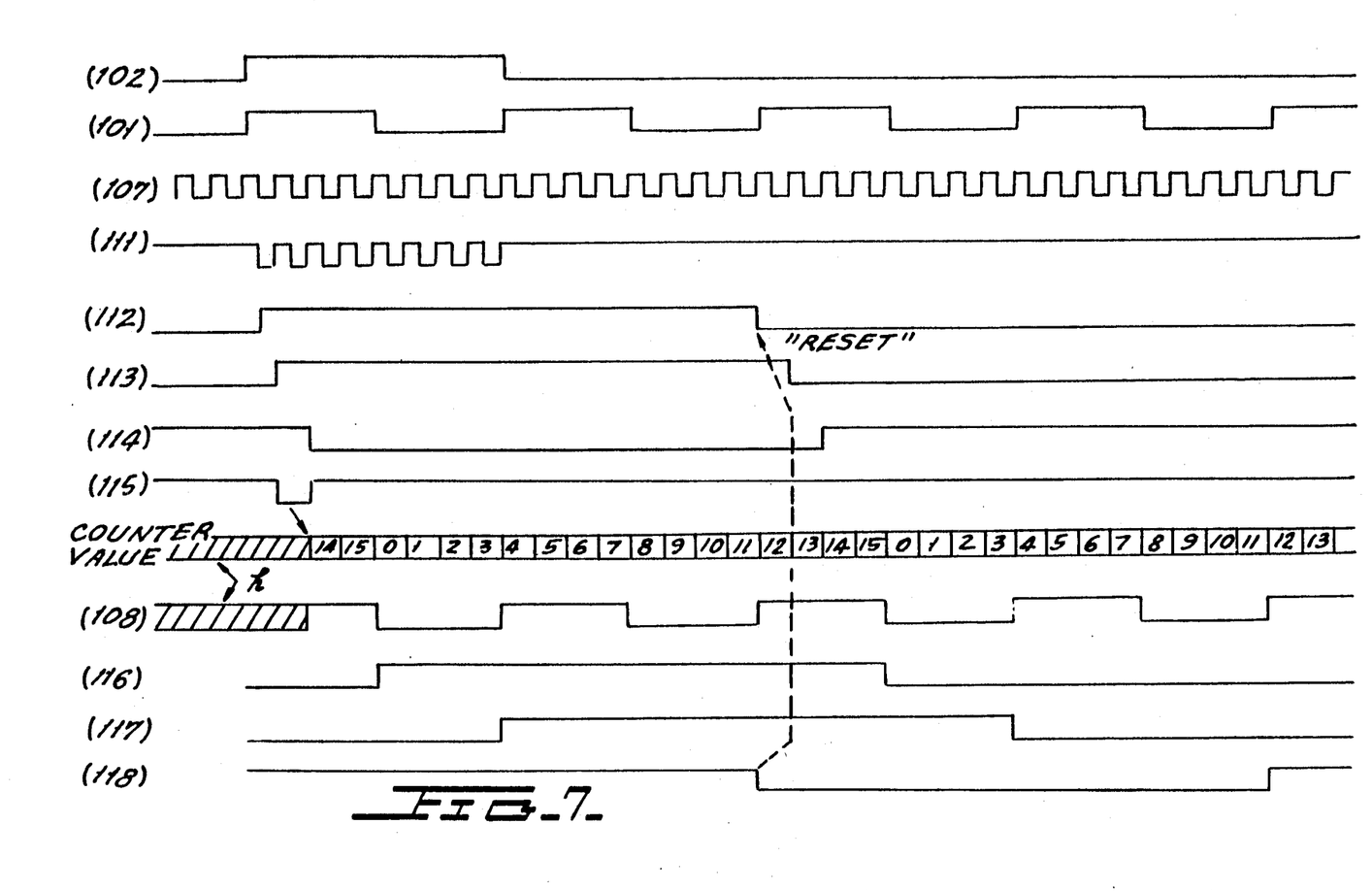
FIG. 7 is a timing chart covering various parts of the clock regenerating circuit shown in FIG. 6.

Referring to FIG. 7 together with FIG. 6, the NAND gate 8, supplies a plurality of setting signals 111 in response to the sync code detection signal 102 synchronized with the received recovered clock signal 101 and an inverted version of the first clock signal 107 from the clock generator 4. Out of the plural setting signals 111, the first one places the set/reset circuit 10 in a set state. A set state signal 112, which is an output of the set/reset circuit 10, is turned into a load pulse signal 115, having the width of one clock of the output clock signal 107 from the clock generator 4, by the differentiating circuit 11 consisting of flip-flops 14 and 15 and a NAND circuit 16. A programmable 4-bit counter 12, which is running to count the first clock and to produce the second clock, loads data input terminals D0, D1, D2 and D3 with a set value "14" in response to every load pulse 15. Thus, the phase of the second clock signal is timed which every detection of the burst synchronization code. It is to be noted, therefore, that a part (h) of the second clock signal 108 in FIGS. 5 and 7 is clock pulses synchronized with recovered clock of the preceding burst. The second clock signal 108, which is the $\frac{1}{4}$ frequency-division result of the first clock signal 107, is supplied from a Q2 terminal. This set value loaded into the data input terminals D0 to D3 is so determined that the leading edges of the second clock signal 108 and of the received recovered clock signal 101 substantially coincide with each other. As is evident from the timing chart of FIG. 7, the initial value is "14" in this preferred embodiment of the invention. Then is prepared in accordance with the set state signal 112 a resetting signal 118, which places the set/reset circuit 10 in a reset state in preparation for the generation of a load signal to initialize again the counter 12 in response to the detection signal 102 which is generated when the next arriving burst signal is inputted. Thus, a resetting signal 118 is prepared by delaying the set state signal 112 with the delay circuit 13 in accordance with the second clock signal 108, and is provided to the set/reset circuit 10 at and after the trailing edge of the sync code detection signal 102. The delay circuit 13 consists of flip-flops 17, 18 and 19 and an inverter 20. In this manner can be generated the second clock signal 108 which is consecutive as well as synchronized with the received recovered clock signal.

Figure 8:
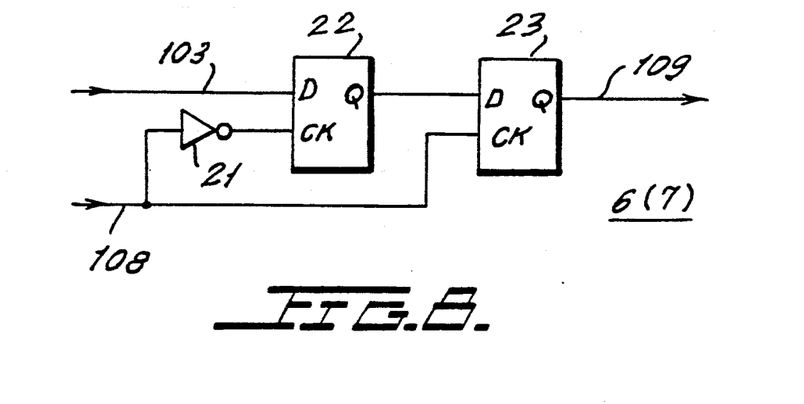
FIG. 8 is a detailed diagram illustrating the retiming circuit used in FIG. 4.
Figure 9:
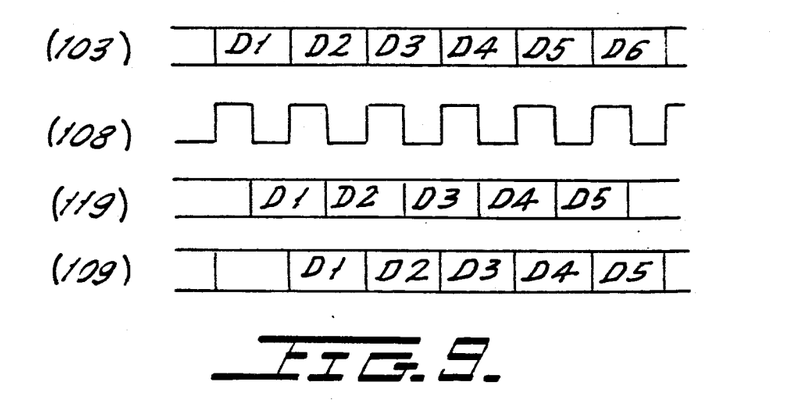
FIG. 9 is a timing chart covering various parts of the retiming circuit shown in FIG. 8.

Referring to FIG. 8, the retiming circuit 6 comprises an inverter 21 and flip-flops 22 and 23. The flip-flop circuit 22, into which the delay circuit output data signal 103 is entered, supplies an output signal 119 in response to the inverted version of the second clock signal 108. The flip-flop circuit 23, into which the output signal flip-flop 22 is entered, supplies the output data signal 109 of the retiming circuit 6 in response to the second clock signal 108. In this manner is converted the delay circuit output data signal 103, synchronized with the received recovered clock signal 101, into the output data signal 109 of the retiming circuit 6, synchronized with the second clock signal 108.

The retiming circuit 7, having the same configuration as the retiming circuit 6, synchronizes the sync code detection signal 102 with the second clock signal 108 and supplies to the data memory circuit 2 as the write start pulse 110.

Although the retiming circuit 6 (7) is composed of two D-type flip-flops and an inverter in this embodiment of the invention in order to allow for a sufficient margin, only one D-type flip-flop would suffice for the retiming purpose if no margin were needed.

Figure 10:
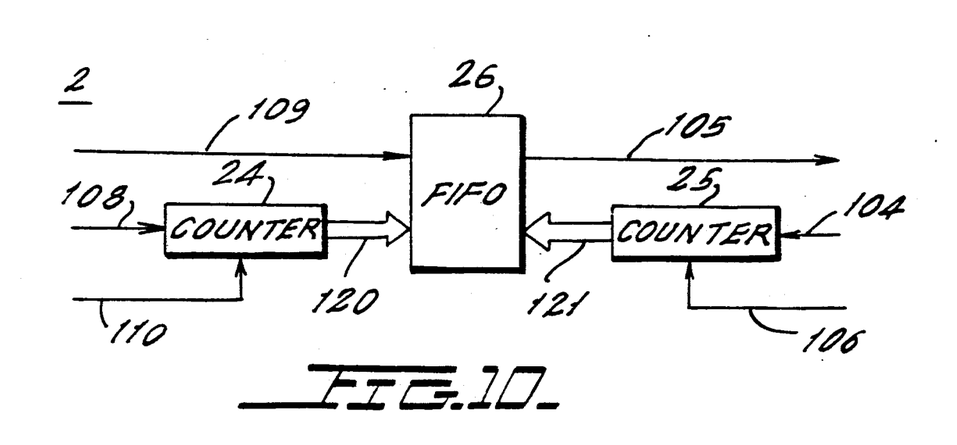
FIG. 10 is a detailed block diagram of the data memory circuit used in FIG. 4.

Referring to FIG. 10, the data memory circuit 2 comprises counters 24 and 25 and a first-in first-out (FIFO) memory 26. The counter 24, initialized by the write start pulse 110, supplies a write address 120 in response to the second clock signal 108. The FIFO memory 26 writes the data signal 109 of the retiming circuit 6 into an address designated by the write address 120. When accessing the data memory circuit 2 from the terminal side, the counter 25 is initialized by the read start pulse 106, and a read address 121 is prepared according to the read clock signal 104 to provide the output data signal 105.

Figure 11:
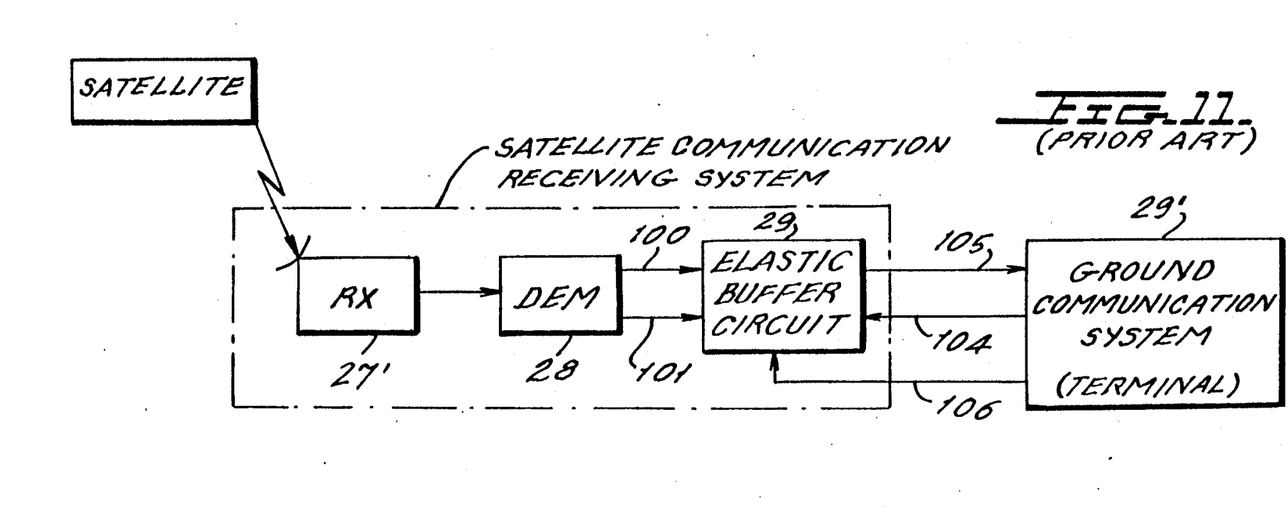
FIG. 11 is a block diagram illustrating a prior art satellite communication receiving system.

In FIG. 11, a satellite communication receiving system receives from a satellite 27 radio frequency burst signals which a receiver 27' converts to signals 119 of intermediate frequency. A demodulator 28 demodulates the signals 119 and supplies signals 100 and a clock signal 101. An elastic buffer circuit 29 converts the signals 100 into signals 105, adapted to the timing of a terminal 29' which is associated with a ground communication system.

Thus, according to the present invention, the first clock signal 107 from the clock generator 4, whose frequency is N times the received clock frequency, is frequency-divided by N to regenerate the second clock signal 108 of the phase immediately following the leading edge of the sync code detection signal 102, so that, even if there is a loss (a) in the received recovered clock signal 101, no loss will occur in the second clock signal 108. And, as this loss-free second clock signal 108 is used as the write clock for the data memory circuit 2, the output data signal 109 of the delay circuit 3, which has a part (b) in which a certain data is duplicated and another part (c) in which a data is absent can be written in without inviting data shift in bit position. Although bit errors do occur in the data-duplicated and data-missing part (g) of the output data signal 105 from the data memory circuit 2 to the terminal side, no burst error can occur in the data after the part (g).

Further, since a frequency-dividing circuit, having the sync code detection signal as its reference, is used as the clock regenerating circuit, the establishment of the phase within one clock of the received recovered clock signal is ensured, so that data can be quickly and accurately extracted from burst signals.

Moreover, the present invention permits much easier circuit designing with the use of only digital circuit components than a PLL circuit involving analog circuit components.

What is claimed is:

1. An elastic buffer circuit for converting data signals derived from burst data signals transmitted via a satellite to a ground communication system, which data signals are demodulated by a demodulator, into signals adapted to the timing of the ground communication system, comprising:
   synchronization code detecting means for detecting from an output of said demodulator a burst synchronization code and a received clock frequency and for supplying a detection signal;
   stable clock generating means for generating a first clock signal of a frequency equal to N (N is an integer not smaller than 2) times the received clock frequency;
   clock regenerating means for dividing the first clock signal by N and generating a second clock signal whose phase is determined by said detection signal; and
   data memory means responsive to said detection signal for starting a writing operation, and responsive to said second clock signal for temporarily storing said data signals following said burst synchronization code.

2. An elastic buffer circuit, as claimed in claim 1, wherein the second clock signal immediately follows the leading edge of said detection signal.

3. An elastic buffer circuit, as claimed in claim 1, wherein said clock regenerating means comprises:
- set/reset means;
- means responsive to said detection signal and said first clock signal for preparing a setting signal for said set/reset means;
- timing means responsive to the output signal of said set/reset means for generating a load pulse signal having a width equal to one clock of said first clock signal;
- counter means responsive to said load pulse signal for counting said first clock signal and generating said second clock signal; and
- reset pulse generating means responsive to an output signal of said set/reset means for generating a reset signal for said set/reset means.

4. An elastic buffer circuit for converting data signals derived from burst data signals transmitted via a satellite to a ground communication system, which data signals are demodulated by a demodulator, into signals adapted to the timing of the ground communication system, comprising:
- synchronization code detecting means for detecting from an output of said demodulator a burst synchronization code and a received clock frequency and for supplying a detection signal;
- delay means for delaying said data signals by a delay time equal to that of said synchronization code detecting means;
- stable clock generating means for generating a first clock signal of a frequency equal to N (N is an integer not smaller than 2) times the received clock frequency;
- clock regenerating means for dividing the first clock signal by N and generating a second clock signal whose phase is determined by said detection signal;
- first retiming means for synchronizing the delayed data signals following said burst synchronization code with said second clock signal;
- second retiming means for synchronizing said detecting signal with said second clock signal; and
- data memory means responsive to an output signal of said second retiming means for starting a writing operation and responsive to said second clock signal for temporarily storing an output signal of said first retiming means.

* * * * *